(12) United States Patent
Ogawa

(10) Patent No.: US 7,182,412 B2
(45) Date of Patent: Feb. 27, 2007

(54) BRAKE CONTROLLER

(75) Inventor: Hiroyuki Ogawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/298,477

(22) Filed: Dec. 12, 2005

(65) Prior Publication Data

US 2006/0152077 A1 Jul. 13, 2006

(30) Foreign Application Priority Data

Jan. 7, 2005 (JP) .............................. 2005-002947

(51) Int. Cl.
*B60K 41/24* (2006.01)
(52) U.S. Cl. ..................... 303/113.1; 701/70
(58) Field of Classification Search .. 303/113.1–113.4, 303/155; 701/70–72
See application file for complete search history.

(56) References Cited

U.S. PATENT DOCUMENTS

| 6,370,466 | B1* | 4/2002 | Hada et al. ................... 701/70 |
| 6,434,472 | B1* | 8/2002 | Minowa et al. ................ 701/96 |
| 6,460,645 | B1* | 10/2002 | Asada et al. .................. 180/179 |
| 2001/0029418 | A1* | 10/2001 | Minowa et al. ................ 701/70 |
| 2002/0021045 | A1* | 2/2002 | Hada et al. .............. 303/113.1 |
| 2002/0029943 | A1* | 3/2002 | Totsuka et al. ............. 188/113 |
| 2003/0154014 | A1* | 8/2003 | Iwata et al. .................... 701/93 |
| 2003/0171868 | A1* | 9/2003 | Morishita et al. ............. 701/54 |
| 2004/0153233 | A1* | 8/2004 | Minowa et al. ................ 701/96 |

FOREIGN PATENT DOCUMENTS

| JP | 9-249103 | 9/1997 |
| JP | 2000-313320 | 11/2000 |
| JP | 2004-75055 | 3/2004 |

* cited by examiner

*Primary Examiner*—Christopher P. Schwartz
(74) *Attorney, Agent, or Firm*—Oblon, Spivak, McClelland, Maier & Neustadt, P.C.

(57) ABSTRACT

When it is in a forward or backward range, in an idle state, the vehicle is perfectly stationary, brake releasing velocity Bv is larger than Bv_on, brake stroke Bs is smaller than Bs_on and braking force Bf is larger than driving force Fd, a brake ECU executes a program that includes the steps of starting a timer, controlling the braking force Bf such that it becomes approximately equal to the driving force Fd, and controlling the braking force Bf such that it gradually decreases until it attains to Bend after a predetermined time period.

16 Claims, 3 Drawing Sheets

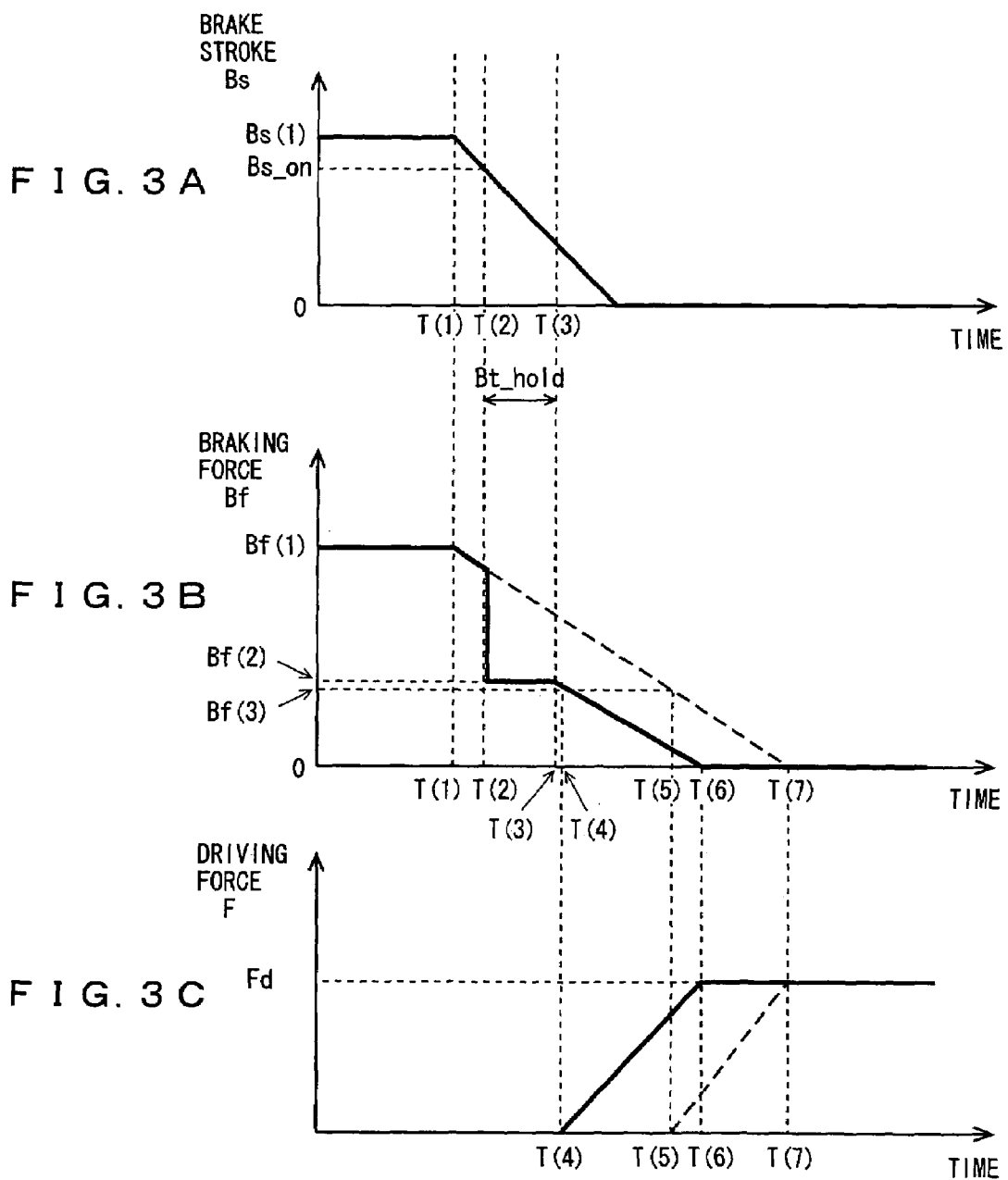

BRAKE CONTROLLER

This nonprovisional application is based on Japanese Patent Application No. 2005-002947 filed with the Japan Patent Office on Jan. 7, 2005, the entire contents of which are hereby incorporated by reference.

BACKGROUND OF THE INVENTION

1. Field of the Invention

The present invention relates to a brake controller and, more specifically, to a controller for controlling the braking force of a brake provided on a power transmission path.

2. Description of the Background Art

Conventionally, techniques for controlling the braking force of a brake based on an amount of operation of a brake pedal by a driver have been proposed. By way of example, Japanese Patent Laying-Open No. 2000-313320 discloses a braking force control unit capable of reducing a sense of abruptness at the time of starting for realizing a smooth start of a vehicle. The braking force control unit operates such that the driving force is transmitted from a motor to driving wheels even when the stepping-on of an accelerator pedal is released at a vehicle speed not higher than a prescribed speed as long as a driving range is selected in a transmission, and the magnitude of the driving force to be transmitted to the driving wheels is switched between large and small in accordance with the state of stepping-on of a brake pedal. When the brake pedal is stepped on, the braking force control unit reduces the driving force to be smaller than when the stepping-on of the brake pedal is released. The braking force control unit includes a braking force retaining means capable of retaining the braking force on the vehicle after releasing the stepping-on of the brake pedal. The braking force retaining means reduces gradually the braking force when the driving force is increased to a large value after stepping-on of the brake pedal is released.

According to the braking force control unit disclosed in the laid-open application described above, the braking force is reduced gradually, and therefore, the sense of abruptness at the time of starting of a vehicle, which was experienced as the braking force was reduced at once, can be suppressed.

In the braking force control unit disclosed in the laid-open application described above, however, though the braking force is reduced at once when the acceleration pedal is stepped on after releasing the brake pedal, the braking force is reduced gradually when the acceleration pedal is not stepped on. Assume, for example, that a vehicle is crawling along in a traffic jam, following the car in front, utilizing creep torque of an automatic transmission. When the braking force is reduced gradually after the brake is released, forward driving force is generated after the creep torque exceeds the braking force. Thus, it takes time until the driving force is generated after the release of the brake pedal, resulting in an unsatisfactory response.

On the other hand, if the braking force is reduced at once after releasing the brake pedal, the vehicle body may have a shock.

SUMMARY OF THE INVENTION

An object of the present invention is to provide a brake controller that suppresses the shock experienced by the vehicle when the brake pedal is released. A further object of the present invention is to provide a brake controller that allows the vehicle to start with good response.

According to an aspect, the present invention provides a brake controller that controls the braking force in accordance with an amount of braking operation by a driver. The brake applies the braking force to a power transmission path of a driving force transmitted from a power source of a vehicle to a driving wheel. The controller includes a driving force detecting unit detecting the driving force, an operation amount detecting unit detecting the amount of braking operation, and a control unit controlling the brake. The control unit includes a braking force control unit controlling the braking force such that when the amount of braking operation becomes equal to or smaller than a predetermined amount of operation, the braking force becomes approximately equal to the detected driving force until after a predetermined time period, and a decrease control unit controlling the braking force such that the braking force is decreased after the predetermined time period.

According to the present invention, the controller controls the braking force such that when the amount of operation reaches equal to or smaller than a predetermined amount of operation, the braking force becomes approximately the same as the detected driving force, until after a predetermined time period. Consequently, the shock experienced by the vehicle body when the braking force is released at once can be suppressed. Further, the braking force is controlled such that it is reduced after a predetermined time period, and therefore, the time from the release of the brake pedal until the braking force attains zero can be made shorter than the time from the release of the brake pedal until the braking force attains zero with the braking force reduced gradually, when the acceleration pedal is not depressed. By way of example, assuming that a vehicle having an automatic transmission crawls along a traffic jam, following a car in front, utilizing the creep torque, the driving force is generated immediately after the brake pedal is released. Therefore, response at the start can be improved. Thus, a brake controller that suppresses the shock experienced by the vehicle when the brake pedal is released and realizes smooth start with good response can be provided.

Preferably, the decrease control unit controls the braking force such that said braking force is decreased gradually.

According to the present invention, the decrease control unit controls the braking force such that the braking force is decreased gradually after a predetermined time period. Consequently, the driving force can be generated immediately while the shock experienced by the vehicle is suppressed, and hence, response at the start can be improved.

More preferably, the controller further includes a rotation speed detecting unit detecting the rotation speed of the power source. The braking force control unit controls the braking force such that the braking force becomes approximately equal to the driving force, based on the detected rotation speed.

According to the present invention, the braking force control unit controls the braking force such that the braking force becomes approximately the same as the driving force, based on the detected rotation speed of a power source (such as an engine). Specifically, by calculating the generated driving force based on the detected rotation speed, for example, based on a map representing a relation between the rotation speed and the driving force and by controlling the braking force to be approximately equal to the calculated driving force, the braking force can be controlled accurately.

More preferably, the controller further includes a rotation speed detecting unit detecting the rotation speed of the power source, and a setting unit setting a predetermined time based on the detected rotation speed.

According to the present invention, by calculating the generated driving force based on the detected rotation speed of a power source (such as an engine), for example, based on a map representing a relation between the rotation speed and the driving force and by setting a predetermined time in accordance with the calculated driving force, appropriate response in accordance with the state of the vehicle can be attained.

More preferably, the controller further includes a time setting unit setting a predetermined time based on the detected driving force.

According to the present invention, a predetermined time can be set in accordance with the detected driving force. The driving force may be detected, for example, from engine torque, characteristic of torque converter of an automatic transmission mechanism, gear ratio, wheel diameter or the like. Thus, appropriate response in accordance with the state of the vehicle can be attained.

More preferably, the braking force control unit controls the braking force such that the braking force becomes approximately equal to the detected driving force when the detected amount of change in the amount of braking operation is not smaller than a predetermined amount of change.

According to the present invention, the braking force control unit controls the braking force such that when the amount of change in the detected amount of operation of the brake pedal is not smaller than a predetermined amount of change, the braking force is made approximately equal to the detected driving force. For instance, when the brake pedal is released at once, the braking force is controlled to be approximately equal to the detected driving force, and therefore, the shock experienced by the vehicle can be suppressed.

More preferably, the power source is an engine. The braking force control unit controls the braking force such that the braking force becomes approximately equal to the detected driving force when the engine enters an idle state.

According to the present invention, the braking force control unit controls the braking force such that when the engine as the power source is in an idle state, the braking force becomes approximately the same as the detected driving force. Accordingly, in the idle state, that is, when the brake pedal is released in a state where the acceleration pedal is not depressed, the braking force can be controlled to be approximately equal to the driving force. Consequently, the driving force can be generated immediately after the brake pedal is released, and the response at the start can be improved.

More preferably, the vehicle is provided with an automatic transmission.

According to the present invention, by applying the present invention to a vehicle having an automatic transmission, response at the start of the vehicle can be improved in a state where the acceleration pedal is not depressed, while suppressing the shock experienced by the vehicle.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A to 3C are timing charts representing an operation of the brake ECU as the brake controller in accordance with the embodiment.

DESCRIPTION OF THE PREFERRED EMBODIMENTS

Figure 1:
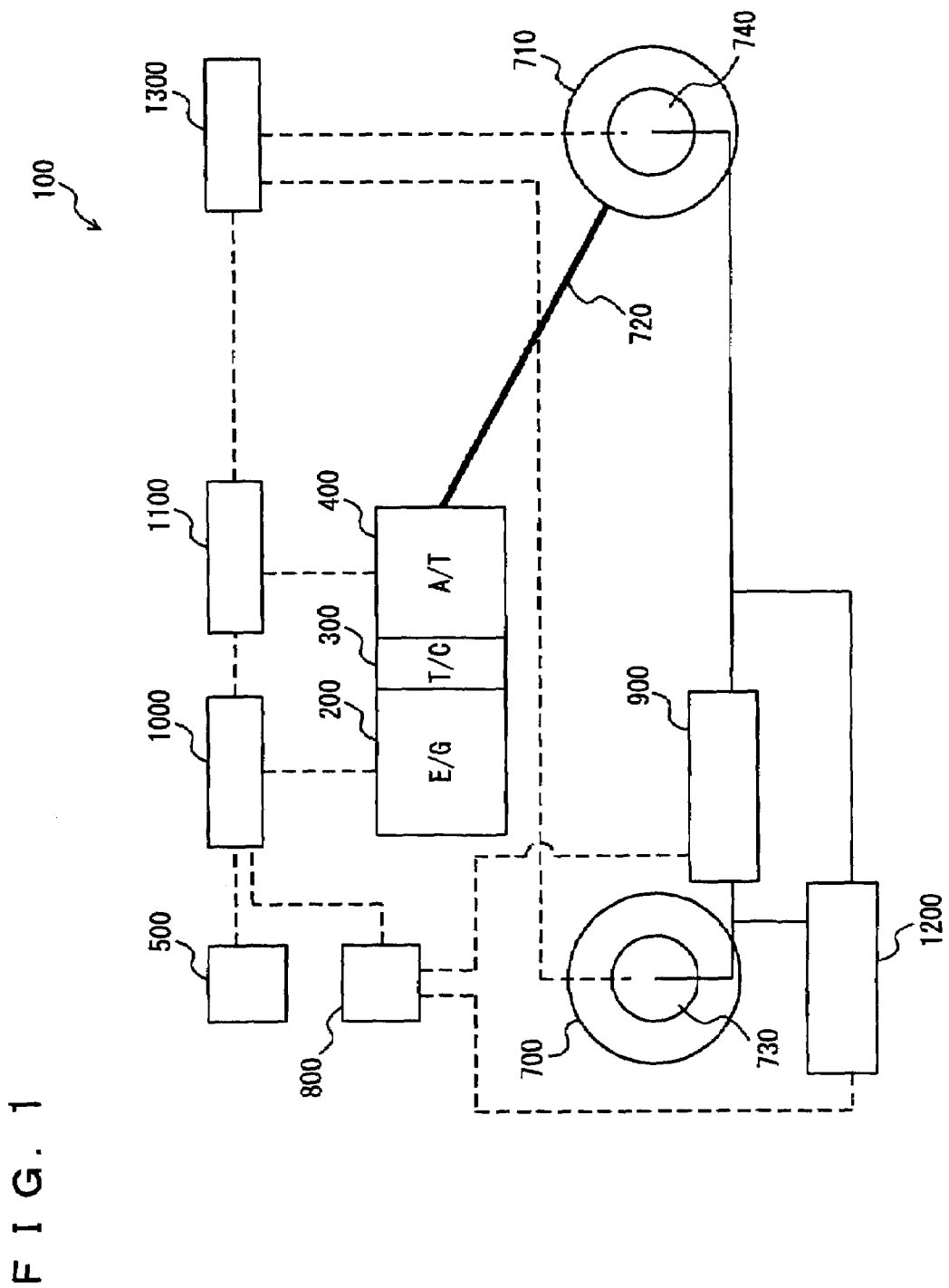
FIG. 1 shows a configuration of a vehicle on which the brake controller in accordance with an embodiment is mounted.

In the following, the brake controller in accordance with an embodiment of the present invention will be described with reference to the figures. In the following description, the same portions are denoted by the same reference characters. They have the same names and functions, and therefore, detailed description thereof will not be repeated.

Referring to FIG. 1, the configuration of a vehicle 100 including the brake controller in accordance with the present embodiment will be described. In the following, the vehicle is described as a rear-wheel drive car. Application of the present invention, however, is not limited to a rear-wheel drive car, and the vehicle may be front-wheel drive or four-wheel drive.

As shown in FIG. 1, vehicle 100 includes an engine 200 as a motor generating the driving force of vehicle 100, a planetary-gear type automatic transmission mechanism 400 to which an output of engine 200 is transmitted through a torque converter 300, a front-wheel 700 as a driven wheel, a rear-wheel 710 as a driving wheel connected to an output shaft of planetary-gear type automatic transmission mechanism 400 through a propeller shaft 720, a brake (1) 730 generating a braking force at front-wheel 700 and a brake (2) 740 generating a braking force at rear-wheel 710.

Vehicle 100 further includes a brake operation amount detecting sensor 500 detecting an amount of operation of a brake pedal by a driver, a brake actuator 900 for actuating brake (1) 730 and brake (2) 740 provided at front and rear wheels 700 and 710, a braking force detector 1200 detecting the braking force of brake (1) 730 and brake (2) 740, and a wheel rotation detector 1300 detecting rotation of the wheel.

Further, vehicle 100 includes an engine ECU (Electronic Control Unit) 1000 controlling engine 200, an ECT (Electronically Controlled Automatic Transmission) ECU 1100 controlling torque converter 300 and planetary-gear type automatic transmission mechanism 400, and a brake ECU 800 controlling brake actuator 900.

In vehicle 100, various components are formed to be capable of bi-directional data communication through communication lines represented by dotted lines in FIG. 1. Engine 200 may be any motor, such as a gasoline engine, a diesel engine or other internal combustion engine, or it may be an electric motor.

Torque converter 300 may be any fluid coupling other than a torque converter, or it may be a wet friction clutch, a dry friction clutch, an electromagnetic clutch, a direct train, or a power train (electric motor) utilizing electromagnetism. Further, planetary-gear type automatic transmission mechanism 400 may be a manual transmission, a belt-type continuously variable transmission, or a direct power train.

Brake (1) 730 is a device for generating braking force at a front wheel 700 of the vehicle. Brake (2) 740 is a device for generating braking force at a rear-wheel 710 of the vehicle. In the present embodiment, vehicle 100 has four wheels, and a brake is provided for each wheel. Specifically, each of the two front wheels 700 has brake (1) 730, and each of the two rear-wheels 710 has brake (2) 740. In the present embodiment, brake ECU 800 controls braking forces of brakes (1) and (2) independent from each other. Alternatively, the braking force of four wheels may be controlled independent from each other.

Brake (1) 730 and brake (2) 740 are, for example, implemented by a disk brake, but not limited thereto. A disk brake includes a disk (not shown) provided on the side of the wheel and a caliper (not shown) provided on the side of the vehicle. The caliper is provided with a wheel cylinder connected to an oil hydraulic circuit. When hydraulic pressure increases in the wheel cylinder, the caliper pinches the disk and generates the braking force.

Brake actuator 900 is formed of an electromagnetic valve or the like, and controls increase/decrease of hydraulic pressure in the oil hydraulic circuit. Specifically, as the hydraulic pressure in the oil hydraulic circuit connected to the wheel cylinder is controlled by brake actuator 900, the braking force generated in brake (1) 730 and brake (2) 740 can be controlled.

At the time of braking in vehicle 100, brake ECU 800 detects a required braking force necessary for the vehicle, based on the amount of operation of the brake pedal by the driver, which is detected by brake operation amount detecting sensor 500. Brake ECU 800 calculates a target acceleration of the vehicle, based on the detected required braking force. Brake ECU 800 calculates the braking force necessary for vehicle 100 to have the actual acceleration of the vehicle detected by wheel rotation detector 1300 or acceleration sensor (not shown) match the target acceleration. Brake ECU 800 distributes the calculated braking force to the wheels, and controls the hydraulic pressure of the wheel cylinder described above, through brake actuator 900.

When the driver releases the brake pedal of vehicle 100, the hydraulic pressure in the oil hydraulic circuit decreases, and the force of caliper pinching the disk decreases. Consequently, the braking force decreases. Here, if the braking force is reduced at once after releasing the brake pedal, the vehicle may have a shock.

Further, assume that the vehicle is crawling along in a traffic jam, following the car in front, utilizing creep torque. The creep torque is a driving force derived from the power of engine 200 output through planetary-gear type automatic transmission mechanism 400 to rear wheel 710 as the driving wheel, even when the vehicle is parked. In this case, when the braking force is reduced gradually after the release of the brake pedal, forward driving force is generated when the creep torque exceeds the braking force. Thus, it takes time until the driving force is generated after the release of the brake pedal, possibly resulting in unsatisfactory response.

Therefore, the present invention is characterized in that the braking force is controlled such that when the amount of operation reaches equal to or smaller than a predetermined amount of operation, the braking force becomes approximately the same as the detected driving force, until after a predetermined time period. The present invention is further characterized in that the braking force is controlled such that it is reduced after a predetermined time period.

Specifically, brake ECU 800 as the brake controller in accordance with the present invention controls, when the amount of operation of the brake pedal detected by brake operation amount detecting sensor 500 attains to a predetermined amount of operation or smaller, the hydraulic pressure of the wheel cylinder through brake actuator 900, so that the braking force becomes approximately the same as the driving force derived from the creep torque. The braking force is controlled such that the hydraulic pressure is reduced gradually after a predetermined time period.

Figure 2:
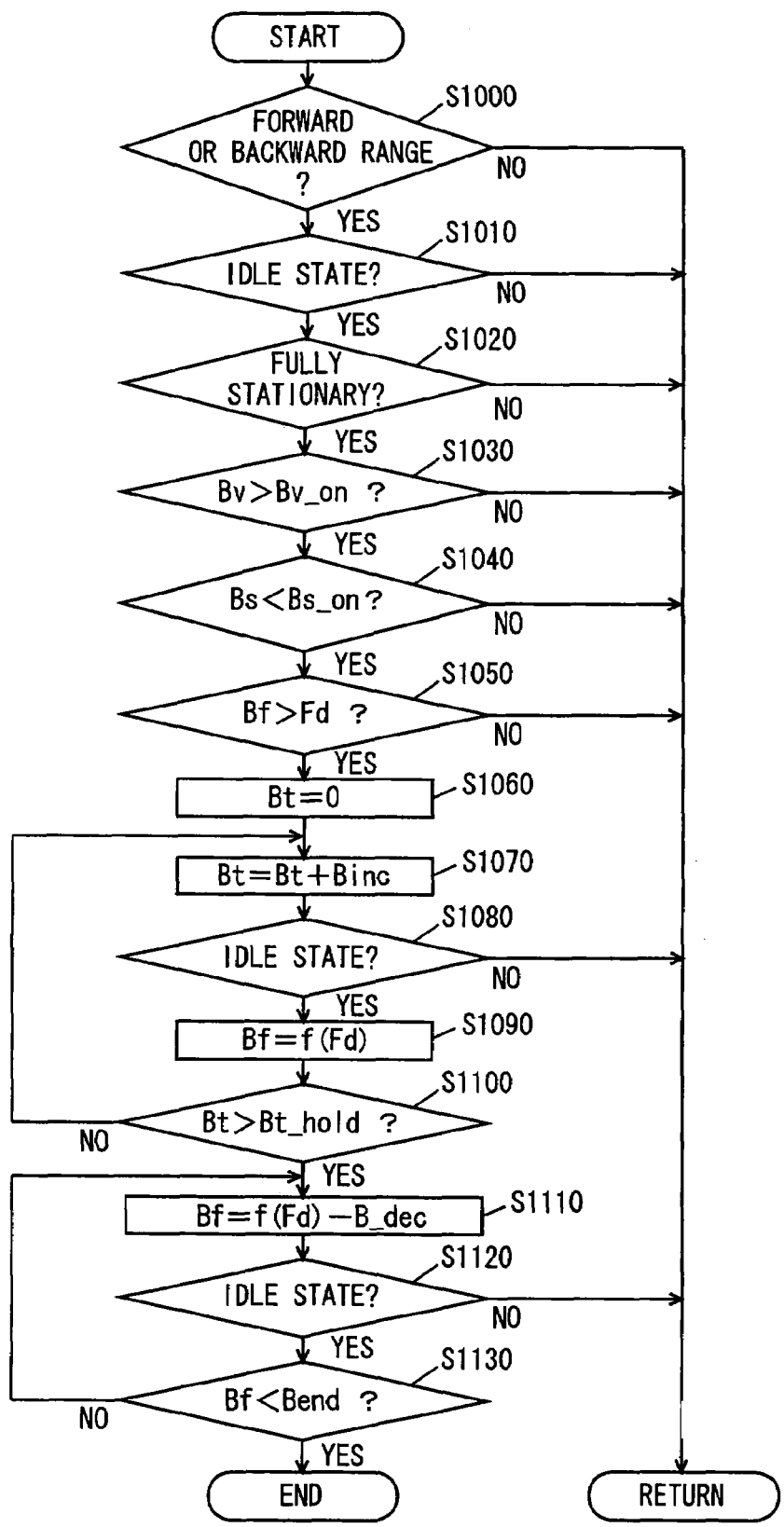
FIG. 2 is a flow chart representing a control structure of a program executed by a brake ECU as the brake controller in accordance with the embodiment.

In the following, a control structure of the program executed by brake ECU 800 as the brake controller in accordance with the present invention will be described with reference to FIG. 2.

In step (hereinafter denoted by S) 1000, brake ECU 800 determines whether the shift position is selected in a forward range or backward range. Specifically, brake ECU 800 determines, based on a shift position signal from planetary-gear type automatic transmission mechanism 400 received through ECT_ECU 1100 and engine ECU 1000, whether the currently selected shift position is in a forward range or backward range. When it is determined that the forward range or backward range is selected (YES in S1000), the process proceeds to S1010. Otherwise (NO in S1000), the process ends.

In S1010, brake ECU 800 determines whether the engine 200 is in an idle state or not. For instance, brake ECU 800 determines, based on signals indicating the rotation speed of engine 200 received through engine ECU 1000, amount of intake air, open position of throttle, open position of acceleration pedal and the like, whether engine 200 is in an idle state or not. If it is determined that the engine 200 is in the idle state (YES in S1010), the process proceeds to S1020. Otherwise (NO in S1010), the process ends.

In S1020, brake ECU 800 determines whether the vehicle is perfectly stationary or not. For instance, brake ECU 800 determines, based on whether the wheel speed detected by wheel rotation detector 1300 is zero or not, whether the vehicle is perfectly stationary or not. If it is determined that the vehicle is perfectly stationary (YES in S1020), the process proceeds to S1030. Otherwise (NO in S1020), the process ends.

In S1030, brake ECU 800 determines whether a brake releasing velocity Bv is larger than a predetermined velocity Bv_on or not. The brake releasing velocity Bv is calculated based on the amount of change with time of the brake pedal operating amount detected by brake operation amount sensor 500. If the brake releasing velocity Bv is smaller than Bv_on, it can be determined that the driver wants to reduce the braking force slowly. If the brake releasing velocity Bv is larger than Bv_on, it can be determined that the brake pedal is being released at once. If the brake releasing velocity Bv is larger than Bv_on (YES in S1030), the process proceeds to S1040. If not (NO in S1030), the process ends.

In S1040, brake ECU 800 determines whether a brake stroke Bs is smaller than a predetermined amount of operation Bs_on or not. Brake ECU 800 determines whether it is smaller than a predetermined amount of operation Bs_on or not, based on a detection signal corresponding to the brake stroke Bs detected by brake operation amount sensor 500. If it is determined that brake stroke Bs is smaller than Bs_on (YES in S1040), the process proceeds to S1050, and if not (NO in S1040), the process ends.

In S1050, brake ECU 800 determines whether the braking force Bf is larger than the driving force Fd generated by rear-wheel 710 as the driving wheel or not. Brake ECU 800 calculates the braking force Bf at every wheel, based on the amount of operation of the brake pedal. On the other hand, brake ECU 800 calculates the driving force Fd, based on signals indicating the rotation speed of engine 200, amount of intake air, open position of throttle, characteristic of torque converter 300, gear ratio of automatic transmission 400 and the like. Alternatively, brake ECU 800 may calculate the driving force Fd from a map representing the relation between rotation speed and driving force, based on the rotation speed of engine 200. By calculating in this manner, the driving force Fd can be calculated accurately.

If it is determined that the braking force Bf is larger than the driving force Fd (YES in S1050), the process proceeds to S1060. Otherwise (NO in S1050), the process ends.

IN S1060, brake ECU 800 sets the value Bt to zero. Specifically, brake ECU 800 starts counting by a timer. In S1070, brake ECU 800 has the value obtained by adding a predetermined count value Binc to Bt set as the value Bt.

In S1080, brake ECU 800 determines whether engine 200 is in an idle state or not. If it is determined that engine 200 is in the idle state (YES in S1080), the process proceeds to S1090. Otherwise (NO in S1080), the process ends.

In S1090, brake ECU 800 controls brake (1) 730 and brake (2) 740 through brake actuator 900 such that the braking force Bf attains to a value calculated by a function f(Fd) having the driving force Fd at the start of control as an input. The function f(Fd) is not specifically limited, as long as it has the driving force Fd at the start of control as an input and provides a value that is approximately the same as the driving force immediately before the vehicle starts moving. By way of example, the function f(Fd) may calculate a value that is approximately proportional to the driving force Fd.

In S1100, brake ECU 800 determines whether the value Bt is larger than Bt_hold or not. The value Bt_hold represents the time of controlling the braking force Bf such that it becomes approximately the same as the driving force immediately before the vehicle starts moving. Preferably, Bt_hold is set based on the rotation speed of engine 200. The control time may be set, for example, in accordance with the driving force calculated by using the map representing the relation between the rotation speed of engine 200 and the driving force. Alternatively, a predetermined time may be set as Bt_hold based on the driving force Fd calculated in S1050. This provides appropriate response reflecting the state of the vehicle. For instance, if the driving force is small, the time Bt_hold may be set shorter so that the time from releasing of the brake pedal to the start of movement of vehicle 100 is made shorter, and if the driving force is large, the time Bt_hold may be set longer so that the shock on the vehicle body is suppressed. Alternatively, the time Bt_hold may be a predetermined time.

If it is determined that the value Bt is larger than Bt_hold (YES in S1100), the process proceeds to S1110. Otherwise (NO in S1100), the process returns to S1070.

In S110, brake ECU 800 controls brake (1) 730 and brake (2) 740 through brake actuator 900 such that the braking force Bf attains to a braking force obtained by subtracting B_dec from f(Fd). The value B_dec represents the reduction rate of the braking force, and is not specifically limited. For example, it may be a predetermined value, or it may be set based on the driving force Fd, Bt_hold or the like.

In S1120, brake ECU 800 determines whether engine 200 is in the idle state or not. If it is determined that engine 200 is in the idle state (YES in S1120), the process proceeds to S1130. Otherwise (NO in S1120), the process ends.

In S1130, whether the braking force Bf is smaller than Bend or not is determined. Here, Bend represents a predetermined value for determining an end of control of the braking force, and is not specifically limited. If it is determined that the braking force Bf is smaller than Bend (YES in S1130), the control ends. Otherwise (NO in S1130), the process proceeds to S1110.

An operation of brake ECU 800 as the brake controller in accordance with the present embodiment, based on the structure and flow chart above, will be described with reference to FIGS. 3A to 3C.

In vehicle 100, when the selected shift position is in the forward range or backward range (YES in S1000), engine 200 is maintained in the idle state (YES in S1010) and the vehicle is parking (YES in S1020), the braking force Bf exceeds substantial driving force based on the creep torque. Therefore, apparent driving force F attains to zero. At time T(1), when the driver releases the brake pedal, the brake stroke Bs begins to decrease from B(1), as shown by the solid line of FIG. 3A.

At time T(2), when the releasing velocity Bv of the brake pedal is larger than Bv_on (YES in S1030), the brake stroke Bs is smaller than Bs_on (YES in S1040), and the braking force Bf is larger than the driving force Fd (YES in S1050), timer counting starts (S1060, S1070). When engine 200 is maintained in the idle state (YES in S1080), brake ECU 800 controls brake (1) 730 and brake (2) 740 such that the braking force Bf attains to the output value Bf(2) obtained from function f(Fd), using the calculated driving force Fd as an input value, as shown by the solid line in FIG. 3B (S1090). Here, Bf(2) is approximately equal to the driving force immediately before the vehicle starts moving. Therefore, the apparent driving force F is still zero, as shown in FIG. 3C. Thus, vehicle 100 is stationary.

At time T(3), when the time counted by the timer passes the predetermined time Bt_hold (YES in S1100), braking force Bf is controlled such that it decreases gradually at a rate of B_dec (S1100).

At time T(4), when the braking force Bf gradually decreases from Bf(2) to Bf(3), the driving force exceeds the braking force. Therefore, apparent driving force F is exhibited, and vehicle 100 starts to move. At this time, the apparent driving force F increases as the braking force Bf decreases, as shown by the solid line of FIG. 3C. At time T(6), when engine 200 is maintained in the idle state (S1120) and the decreased braking force Bf attains to Bend (YES in S1130), the braking force attains to zero, and thus vehicle 100 starts to move forward with the driving force Fd that corresponds to the creep torque.

On the other hand, if the braking force is controlled to decrease gradually from Bf(1), when the braking force attains to Bf(3) at time T(5), the driving force of vehicle 100 exceeds the braking force and the vehicle starts to move. At time T(7), when the decreased braking force attains to approximately zero as shown by the dotted line in FIG. 3C, the vehicle moves forward with the driving force Fd that corresponds to the creep torque.

As described above, by the brake controller in accordance with the present embodiment, the brake ECU controls the braking force Bf such that when the brake pedal is released and the amount of operation becomes equal to or smaller than the predetermined amount of operation, the braking force is made approximately the same as the detected driving force Fd until after a predetermined time period. Consequently, the shock experienced by the vehicle when the braking force is released at once can be suppressed. Further, as the braking force is controlled to be decreased after a prescribed time period, the time from the release of the brake pedal until the braking force attains to zero with the acceleration pedal not depressed can be made shorter than when the braking force is decreased gradually after releasing the brake pedal. Therefore, assuming that a vehicle having a planetary-gear type automatic transmission crawls along a traffic jam, following a car in front, utilizing the creep torque, the driving force is generated immediately after the brake pedal is released. Therefore, response at the start can be improved. Thus, a brake controller that suppresses the shock experienced by the vehicle when the brake pedal is released and realizes smooth start with good response can be provided. Further, by calculating the driving force accurately from the rotation speed of the engine, engine torque or the like and by controlling the braking force to be approximately equal to the calculated driving force, the braking force can be controlled accurately.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A controller for a brake controlling braking force in accordance with an amount of braking operation by a driver, said brake applying the braking force to a power transmission path of a driving force transmitted from a power source of a vehicle to a driving wheel, said controller comprising:
   a driving force detecting unit detecting said driving force on the power transmission path of the driving force transmitted from the power source of the vehicle to the driving wheel;
   an operation amount detecting unit detecting said amount of braking operation; and
   a control unit controlling said brake; wherein
   said control unit includes
   a braking force control unit controlling said braking force such that at a first time point when said amount of braking operation becomes equal to or smaller than a predetermined amount of operation, said braking force is reduced to be approximately equal to said detected driving force at substantially said first time point, and is held approximately equal to said detected driving force until after a predetermined time period following said first time point, and
   a decrease control unit controlling said braking force such that said braking force is decreased after said predetermined time period.

2. The brake controller according to claim 1, wherein said decrease control unit controls said braking force such that said braking force is decreased gradually.

3. The brake controller according to claim 1, further comprising a rotation speed detecting unit detecting the rotation speed of said power source; wherein
   said braking force control unit controls said braking force such that said braking force is reduced to be approximately equal to said driving force, based on said detected rotation speed.

4. The brake controller according to claim 1, further comprising:
   a rotation speed detecting unit detecting the rotation speed of said power source; and
   a setting unit setting a predetermined time based on said detected rotation speed.

5. The brake controller according to claim 1, further comprising:
   a time setting unit setting a predetermined time based on said detected driving force.

6. The brake controller according to claim 1, wherein said braking force control unit controls the braking force such that said braking force is reduced to be approximately equal to said detected driving force when detected amount of change in said amount of braking operation is not smaller than a predetermined amount of change.

7. The brake controller according to claim 1, wherein said power source is an engine; and
   said braking force control unit controls the braking force such that said braking force is reduced to be approximately equal to said detected driving force when said engine enters an idle state.

8. The brake controller according to claim 1, wherein said vehicle is provided with an automatic transmission.

9. A controller for a brake controlling braking force in accordance with an amount of braking operation by a driver, said brake applying the braking force to a power transmission path of a driving force transmitted from a power source of a vehicle to a driving wheel, said controller comprising:
   driving force detecting means for detecting said driving force on the power transmission path of the driving force transmitted from the power source of the vehicle to the driving wheel;
   operation amount detecting means for detecting said amount of braking operation; and
   control means for controlling said brake; wherein
   said control means includes
   braking force control means for controlling said braking force such that at a first time point when said amount of braking operation becomes equal to or smaller than a predetermined amount of operation, said braking force is reduced to be approximately equal to said detected driving force at substantially said first time point, and is held approximately equal to said detected driving force until after a predetermined time period following said first time point, and
   decrease control means for controlling said braking force such that said braking force is decreased after said predetermined time period.

10. The brake controller according to claim 9, wherein said decrease control means includes means for controlling said braking force such that said braking force is decreased gradually.

11. The brake controller according to claim 9, further comprising means for detecting the rotation speed of said power source; wherein
    said braking force control means includes means for controlling said braking force such that the braking force is reduced to be approximately equal to said driving force, based on said detected rotation speed.

12. The brake controller according to claim 9, further comprising:
    means for detecting the rotation speed of said power source; and
    means for setting a predetermined time based on said detected rotation speed.

13. The brake controller according to claim 9, further comprising:
    means for setting a predetermined time based on said detected driving force.

14. The brake controller according to claim 9, wherein said braking force control means includes means for controlling said braking force such that said braking force is reduced to be approximately equal to said detected driving force when detected amount of change in said amount of braking operation is not smaller than a predetermined amount of change.

15. The brake controller according to claim 9, wherein said power source is an engine; and
    said braking force control means includes means for controlling said braking force such that said braking force is reduced to be approximately equal to said detected driving force when said engine enters an idle state.

16. The brake controller according to claim 9, wherein said vehicle is provided with an automatic transmission.

* * * * *